United States Patent
Yeon et al.

(10) Patent No.: US 9,336,488 B2
(45) Date of Patent: May 10, 2016

(54) LEAF NODE RANKING METHOD IN DECISION TREES FOR SPATIAL PREDICTION AND ITS RECORDING MEDIUM

(71) Applicant: Korea Institute of Geoscience and Mineral Resources, Daejeon (KR)

(72) Inventors: Young Kwang Yeon, Sejong (KR); Seong-Jun Cho, Daejeon (KR); Jong Gyu Han, Daejeon (KR)

(73) Assignee: KOREA INSTITUTE OF GOESCIENCE & MINERAL RESOURCES, Daejeon (KR)

( * ) Notice: Subject to any disclaimer, the term of this patent is extended or adjusted under 35 U.S.C. 154(b) by 0 days.

(21) Appl. No.: 14/580,375

(22) Filed: Dec. 23, 2014

(65) Prior Publication Data

US 2015/0371141 A1 Dec. 24, 2015

(30) Foreign Application Priority Data

Jun. 23, 2014 (KR) .............................. 2014-0076414

(51) Int. Cl.
*G06N 99/00* (2010.01)
*G06N 5/04* (2006.01)
*G06N 7/00* (2006.01)

(52) U.S. Cl.
CPC ................ *G06N 5/045* (2013.01); *G06N 7/005* (2013.01); *G06N 99/005* (2013.01)

(58) Field of Classification Search
None
See application file for complete search history.

(56) References Cited

FOREIGN PATENT DOCUMENTS

| KR | 10-0693770 B1 | 3/2007 |
| KR | 10-0789966 B1 | 12/2007 |
| KR | 10-0944234 B1 | 2/2010 |
| KR | 10-1264223 B1 | 5/2013 |

OTHER PUBLICATIONS

Yeon, Y., et al. "Landslide susceptibility mapping in Injae, Korea, using a decision tree." Engineering Geology 116.3 (2010): 274-283.*
Ferri, C. et al. "Improving the AUC of probabilistic estimation trees." Machine Learning: ECML 2003. Springer Berlin Heidelberg, 2003. 121-132.*
Zadrozny, B. et al. "Obtaining calibrated probability estimates from decision trees and naive Bayesian classifiers." ICML. vol. 1. 2001.*
Provost, F. et al. "Tree induction for probability-based ranking." Machine Learning 52.3 (2003): 199-215.*

(Continued)

*Primary Examiner* — Ben Rifkin
*Assistant Examiner* — Eric Nilsson
(74) *Attorney, Agent, or Firm* — Dentons US LLP

(57) ABSTRACT

The present inventions generally relate to a leaf node ranking method in decision trees for spatial prediction and its recording medium. The leaf node ranking method in decision trees includes a learning step to form a decision tree having one root node, in which each parent node has multiple child nodes, using training data sets for spatial prediction; and a leaf node ranking step from the decision tree that finishes the learning. In the learning step, each node of the decision tree stores both the number of classes according to class distribution of training data and structures for storing the number. In the leaf node ranking step, a rank of a leaf node is determined using the number of classes according to class distribution, which is stored in each node on a path from the root node to the leaf node.

2 Claims, 5 Drawing Sheets

(56) References Cited

OTHER PUBLICATIONS

Cestnik, B. et al.; "Estimating Probabilities: A Crucial Task in Machine Learning"; In Proc. of the European Conf. on Artificial Intelligence; 1990; pp. 147-149.

Cruden, D. M. et al.; "Landslide Types and Processes"; In-Turner, A.K. and R.L. Schuster (eds.), Landslides: Investigation and Mitigation; Transportation Research Board, Special Report, vol. 247, 1996; pp. 36-75.

Cussens, J.; Bayes and Pseudo-bayes Estimates of Conditional Probabilities and Their Reliability:, Proceedings on European Conference on Machine Learning, 1993; pp. 136-152.

Dikau, R. et al.; "Landslide Recognition: Identification, Movement and Causes"—Rock Spreading—A. Pasuto, John Niley & Sons: Chichester, UK, 1996, pp. 122-136.

Brandenberger, T. et al.; "Cumulative Gains Model Quality Metric"; Advances in Decision Sciences; vol. 2009; doi:10.1155/2009/868215; 2009; 14 pages.

Tobler, W. R.; "A Computer Movie Simulating Urban Growth in the Detroit Region"; Economic Geographer, vol. 46; 1970; pp. 234-240.

Wu, X. et al.; "Top 10 Algorithms in Data Mining"; Knowledge and Information Systems, vol. 14, 2008; pp. 1-37.

Quinlan, J. R.; "C4.5: Programs for Machine Learning", Morgan Kaufman Publishers Inc. San Francisco, CA; 1993; 309 pages. Two parts.

\* cited by examiner

FIGURE 4

| Leaf node ranking method | AUC |
|---|---|
| M-estimate | 84.39 |
| Laplace | 84.72 |
| m-branch | 86.07 |
| Present invention | 86.09 |

LEAF NODE RANKING METHOD IN DECISION TREES FOR SPATIAL PREDICTION AND ITS RECORDING MEDIUM

CROSS-REFERENCE TO RELATED APPLICATION

This application claims priority to Korean Patent Application No. 10-2014-0076414 filed on Jun. 23, 2014 and all the benefits accruing therefrom under 35 U.S.C. §119, the contents of which are incorporated by reference in their entirety to the extent permitted by law.

BACKGROUND OF THE INVENTION

1. Field of the Invention

The present invention relates, generally, to spatial prediction and, more particularly, to a leaf node ranking method in decision trees for spatial prediction, and its recording medium, the decision trees being one of data mining classification methods.

2. Description of the Related Art

Decision trees are used for cause analysis of prediction results in various prediction fields because training results may be intuitively converted to decision rules. Also, the decision trees are successfully applied to prediction fields thanks to guaranteeing accuracy and speed.

General tree-based algorithms are comprised of a tree building phase and a tree pruning phase. A difference between tree structures that are constructed from a tree algorithm mostly comes from attribute selection criteria and tree pruning criteria.

After a decision tree is constructed through training data, a decision rule may be converted by differently selecting a path from a root node to a leaf node. Branching from the root node, the training data is finally distributed on the leaf nodes, and a rank (or a priority) of the rule induced from the tree is calculated using class distribution included in the leaf nodes. This rank is calculated by a proportion of multiple classes to total classes, and a small number of classes are considered as misclassifications. On the other hand, in a spatial prediction application, the rank is calculated by a proportion of target classes, which are prediction targets, to the total classes.

As decision trees aim to make "pure" leaves by node splitting criteria, a component ratio of event classes of a leaf node is eventually converged into 0 or 1. Therefore, it is not easy to assign a rank to the leaf node. Existing leaf node ranking methods are invented to solve the above problem and have been used for prediction applications for non-spatial data.

Prediction accuracy may vary according to leaf node ranking methods. Laplace estimate involves applying Laplace correction when calculating a frequency of event classes for evaluating the rank of a leaf node. In other words, Laplace estimate is used to improve existing probability estimates and may be modified as equation 1 for a spatial prediction application.

$$R(\text{node}) = \frac{n_{event} + 1}{n_{event} + n_{non\_event} + c} \quad \text{[equation 1]}$$

Here, c means the number of classes in total data sets.

M-estimate, another method for leaf node ranking, uses a prior probability to an event class. In a spatial prediction application, assuming that b and m are constant parameters and b is the prior probability to an event occurrence, the equation is defined as follows.

$$R(\text{node}) = \frac{n_{event} + bm}{n_{event} + n_{non\_event} + m} \quad \text{[equation 2]}$$

M-branch method is a variation of M-estimate, and is defined as equation 3 for spatial event prediction. Here, m is calculated using the depth of a node and the number of samples that are included in a class without a label.

$$R(\text{node}) = \frac{n_{event} + mR(\text{node.parent})}{n_{event} + n_{non\_event} + m} \quad \text{[equation 3]}$$

Here, the parameter, m, is calculated by the equation, $$M+(d-1)/d \times M\sqrt{N}.$$

As previous leaf node ranking methods (Laplace estimate, m-branch, and M-estimate) are proposed for spatial multi-class classification, existing equations are modified to above defined equations 1 to 3 for a spatial prediction application. In other words, the equations may represent a relative probability of occurrence of an event by modifying the existing equations to reflect a proportion of event-occurring classes to total classes.

DOCUMENTS OF RELATED ART (Patent Document 1) Korean Patent No. 10-1264223, "A SPATIAL PREDICTION ANALYSIS TECHNIQUE USING A DECISION TREE"

(Non-patent Document 1) [1] B. Cestnik, "Estimating probabilities: A crucial task in machine learning", In Proc. Of the European Conf. on Artificial Intelligence, pp. 147-149, 1990.

(Non-patent Document 2) [2] B. Zadrozny, and C. Elkan, "Obtaining calibrated probability estimates from decision trees and naïve Bayesian classifiers", In Proc. 18th Int. Conf. on Machine Learning, pp. 609-616, 2001.

(Non-patent Document 3) [3] C. Ferri, P. A. Flach, and J. Hernndez-Orallo, "Improving the AUC of Probabilistic Estimation Trees", In Proc. Of the 14th European Conf. on Machine Learning, pp. 121-132, 2003.

(Non-patent Document 4) [4] D. M. Cruden, and D. J. Varnes, "Landslide types and process. In: Turner, A. K. and R. L. Schuster (eds.), Landslides: investigation and mitigation. Transportation Research Board, Special Report, vol. 247, pp. 36-75, 1996.

(Non-patent Document 5) [5] F. J. Provost, and P. Domingos, "Tree induction for Probability-based Ranking", Machine Learning, Kluwer Academic Publisher, vol. 52, pp. 199-215, 2003.

(Non-patent Document 6) [6] J. Cussents, "Bayes and psudobayes estimates of conditional probabilities and their reliabilities", Proceedings of European Conference on Machine Learning, pp. 136-152. 1993.

(Non-patent Document 7) [7] J. R. Quinlan, "C4.5: programs for machine learning", Morgan Kaufmann Publishers Inc., San Francisco, Calif., USA, 1993.

(Non-patent Document 8) [8] R. Dikau, L. Schrott, D. Brunsden, and M. L. Ibsen, "Landslide recognition: Identification, Movement and Causes", John Wiley & Sons: Chichester, UK, 1996, pp. 122-136.

(Non-patent Document 9) [9] T. Brandenburger, and A. Furth, "Cumulative Gains Model Quality Metric", Advances in Decision Sciences, doi.org/10.1155/2009/868215, 2009.

(Non-patent Document 10) [10] W. R. Tobler, "A computer movie simulating urban growth in the Detroit region", Economic Geographer, vol. 46, pp. 234-40, 1970.

(Non-patent Document 11) [11] X. Wu, V. Kumar, J. R. Quinlan, J. Ghosh, Q. Yang, H. Motoda, G. J. MacLachlan, A. Ng, B. Liu, P. S. Yu, Z. H. Zhou, M. Steinbach, D. J. Hand, and D. Steinberg, "Top 10 algorithms in data mining", Knowledge and Information Systems, vol. 14, pp. 1-37, 2008.

(Non-patent Document 12) [12] Y. K. Yeon, J. K. Han, and K. H. Ryu, "Landslide susceptibility mapping in Injae, Korea, using a decision tree", Engineering Geology, vol. 116, pp. 274-282, 2010.

SUMMARY OF THE INVENTION

An object of the present invention is to provide a method for effectively determining a relative rank of a leaf node of a tree that learns from training data, for spatial prediction in decision trees.

In order to accomplish the above object, a leaf node ranking method in decision trees for spatial prediction according to an embodiment of the present invention includes: a learning step (S110) to form a decision tree having one root node, in which each parent node has multiple child nodes, using training data set for spatial prediction; and a leaf node ranking step (S120) to determine ranks of leaf nodes in the decision tree that has finished the learning. In the learning step (S110), each node of the decision tree includes both the number of classes according to class distribution of training data and structures for storing the number. In the leaf node ranking step (S120), the rank of the leaf node is determined using the number of classes according to class distribution, which is stored in each node on a path from the root node to the leaf node.

Consequently, a rank is determined for each node forming the trained decision tree, and a relation between the rank of the parent node and child node is defined as equation 4.

$$R(node.parent) \leq R(node.child) \quad \text{[equation 4]}$$

In this case, when the rank of the parent node (R(node.parent)) is the same as the rank of the child node (R(node.child)), the child node does not include a spatial event-occurring class, and when the rank of the child node is more than the rank of the parent node, the child node includes an event-occurring class.

The leaf node ranking step (S130) is performed using equation 5.

$$R(node.child) = R(node.parent) + \frac{n_{event}}{(n_{event} + n_{non\_event}) \times d} \quad \text{[equation 5]}$$

Here, d indicates a depth of a node in a tree.

In order to accomplish the object described above, a computer-readable storage medium is provided to store a leaf node ranking method in decision trees for spatial prediction according to an embodiment of the present invention.

Consequently, a leaf node ranking method in decision trees for spatial prediction according to an embodiment of the present invention may be used to improve problems from existing methods.

A decision tree has various parameters for constructing the tree, and a structure of the tree may vary depending on the parameters. The existing methods using class distributions included in leaf nodes may deduce prediction results susceptible to the tree structure. On the other hand, the present invention uses class distributions included in all nodes in the tree. Therefore, the prediction results are less susceptible to the tree structure compared to the prediction results from the existing methods.

Because spatial data is relatively massive data, it costs much to make a model using the massive data in a decision tree. Also, in the existing methods, as additional user-defined parameters are necessary for a leaf node ranking process, repeated construction of a tree is costly. On the other hand, the present invention does not have additional parameters because the results are not susceptible to the tree structure. Therefore, the present invention may reduce cost for the construction of the tree.

As leaf node ranking methods intends to evaluate relative priorities to rules, an applicative range of the rules may not be applied. In other words, the applicative range of the rules was not reflected in determination of the ranks. On the other hand, as a rule evaluation method according to the present invention uses a result of a parent node, the applicative range of the rule may be effectively reflected on determination of the rank.

Consequently, the leaf node ranking method in decision trees for spatial prediction, proposed by the present invention, may solve the above problems and effectively perform the spatial prediction.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a table illustrating AUC (Area Under the Curve) for a performance evaluation between leaf node ranking methods according to an embodiment of the present invention.

DESCRIPTION OF THE PRESENTLY PREFERRED EMBODIMENTS

Figure 1:
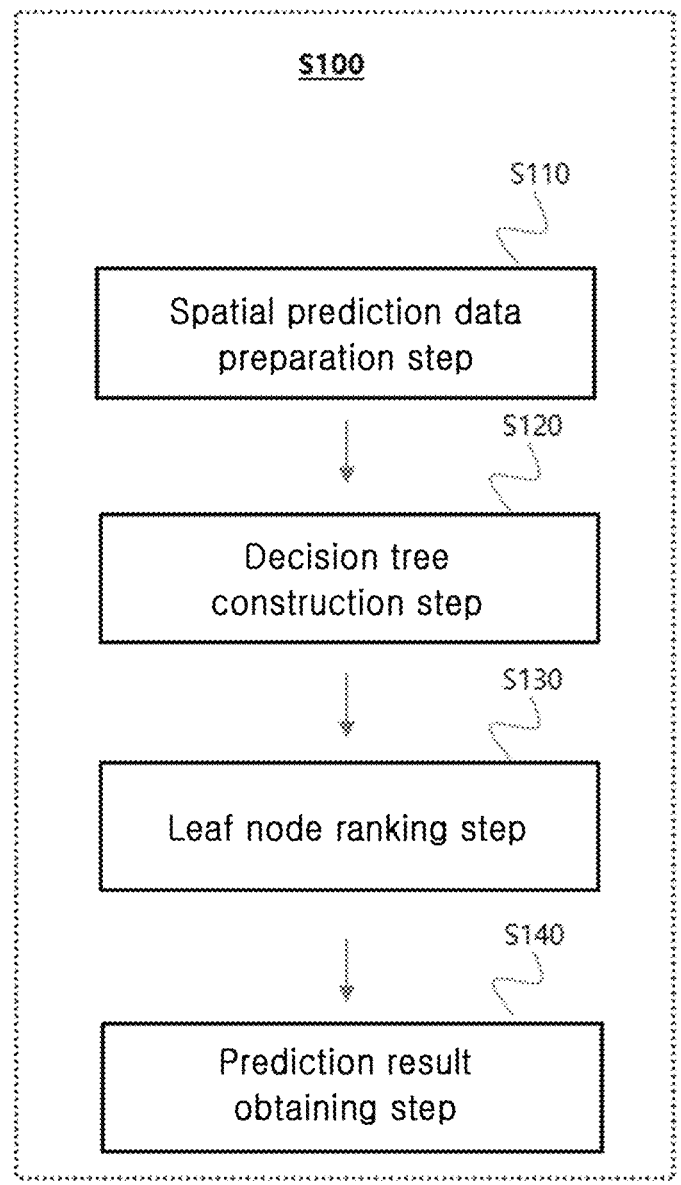
FIG. 1 is a flow diagram illustrating a leaf node ranking method in decision trees for spatial prediction according to an embodiment of the present invention.

Embodiments of the present invention will be described below in detail with reference to the accompanying drawings. In describing the present invention, if a detailed explanation for a related known function or construction is considered to unnecessarily divert the gist of the present invention, such explanation will be omitted but would be understood by those skilled in the art.

As the embodiment according to the present invention is susceptible to various modifications and alternative forms, specific embodiments are shown by way of example in the drawings and will herein be described in detail. It should be understood, however, that there is no intent to limit the invention to the particular forms disclosed. On the contrary, the invention is to cover all modifications, equivalents, and alternatives falling within the spirit and scope of the invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms are intended to include the plural forms as well, unless the context clearly indicates otherwise. It will be further understood that the terms "includes," and/or "has," when used herein, specify the presence of stated features, integers, steps, operations, elements, and/or components, but do not preclude the presence or addition of one or more other features, integers, steps, operations, elements, components, and/or groups thereof.

Hereinafter, referring to accompanying drawings, a leaf node ranking method in decision trees for spatial prediction according to an embodiment present invention will be described in detail.

FIG. 1 is a flow diagram illustrating a leaf node ranking method in decision trees for spatial prediction according to an embodiment of the present invention.

Figure 2:
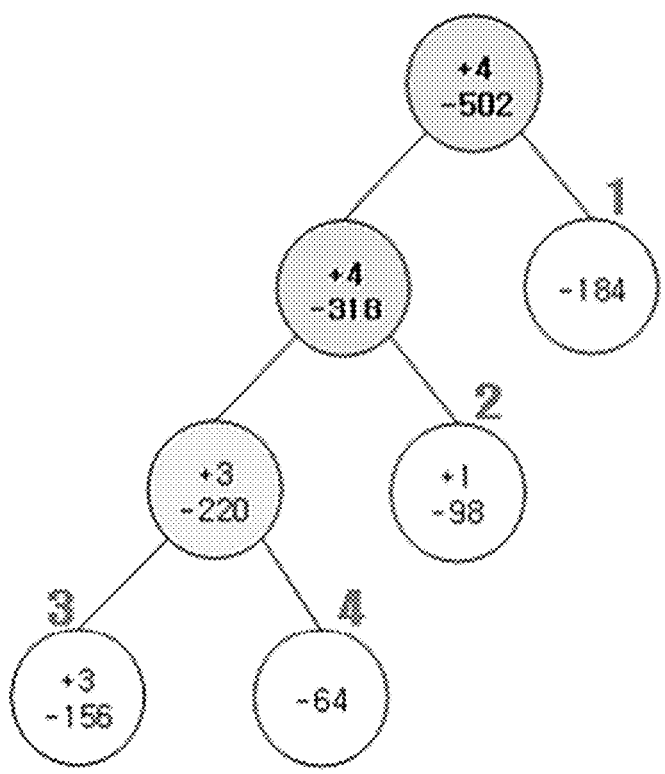
FIG. 2 is a decision tree trained from spatial events and a map on which the location of spatial event is displayed, and numbers displayed with leaf nodes of the decision tree correspond to numbers displayed in rectangular areas of the map, respectively.
Figure 2:
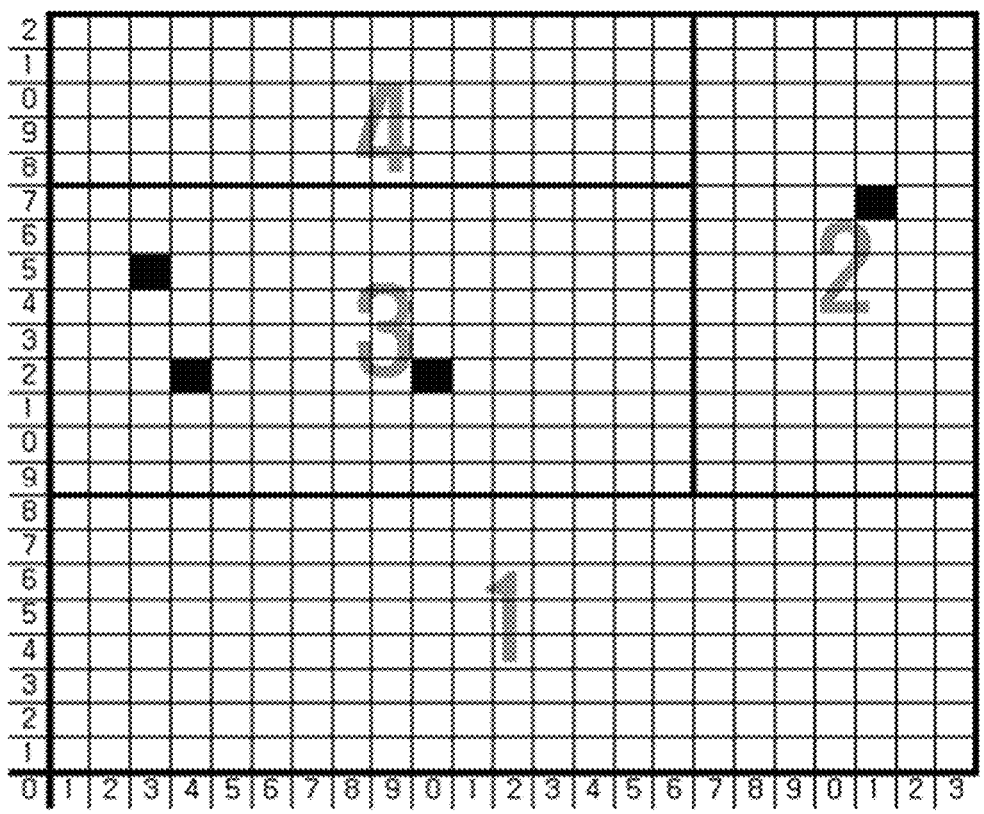

FIG. 2 is a decision tree trained from spatial events and a map on which the location of a spatial event is displayed, and numbers displayed with leaf nodes of the decision tree corresponds to numbers displayed in rectangular areas of the map, respectively according to an embodiment of the invention.

Figure 3:
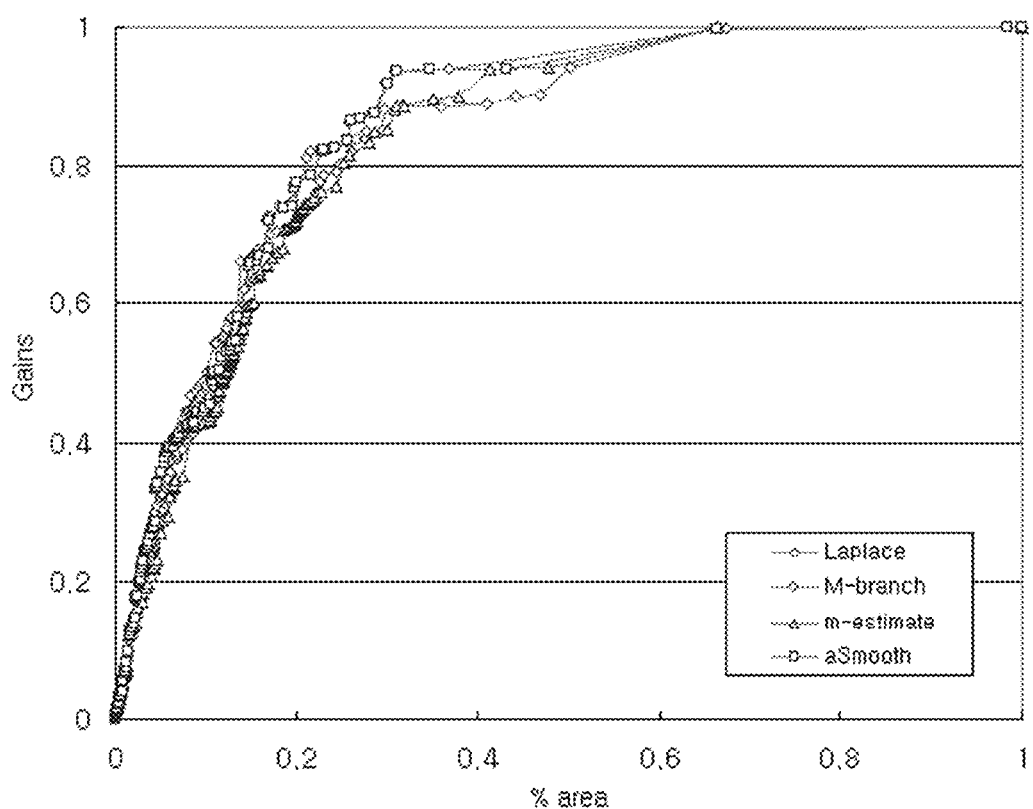
FIG. 3 is a cumulative gain chart of the results respectively from the existing methods (Laplace, m-branch, and M-estimate) and from a leaf node ranking method proposed by an embodiment of present invention.

FIG. 3 is a cumulative gain chart of the results respectively from the existing methods (Laplace, m-branch, and M-estimate) and from a leaf node ranking method proposed by according to an embodiment of the present invention.

FIG. 4 is a table illustrating AUC for performance evaluation between leaf node ranking methods.

Figure 5:
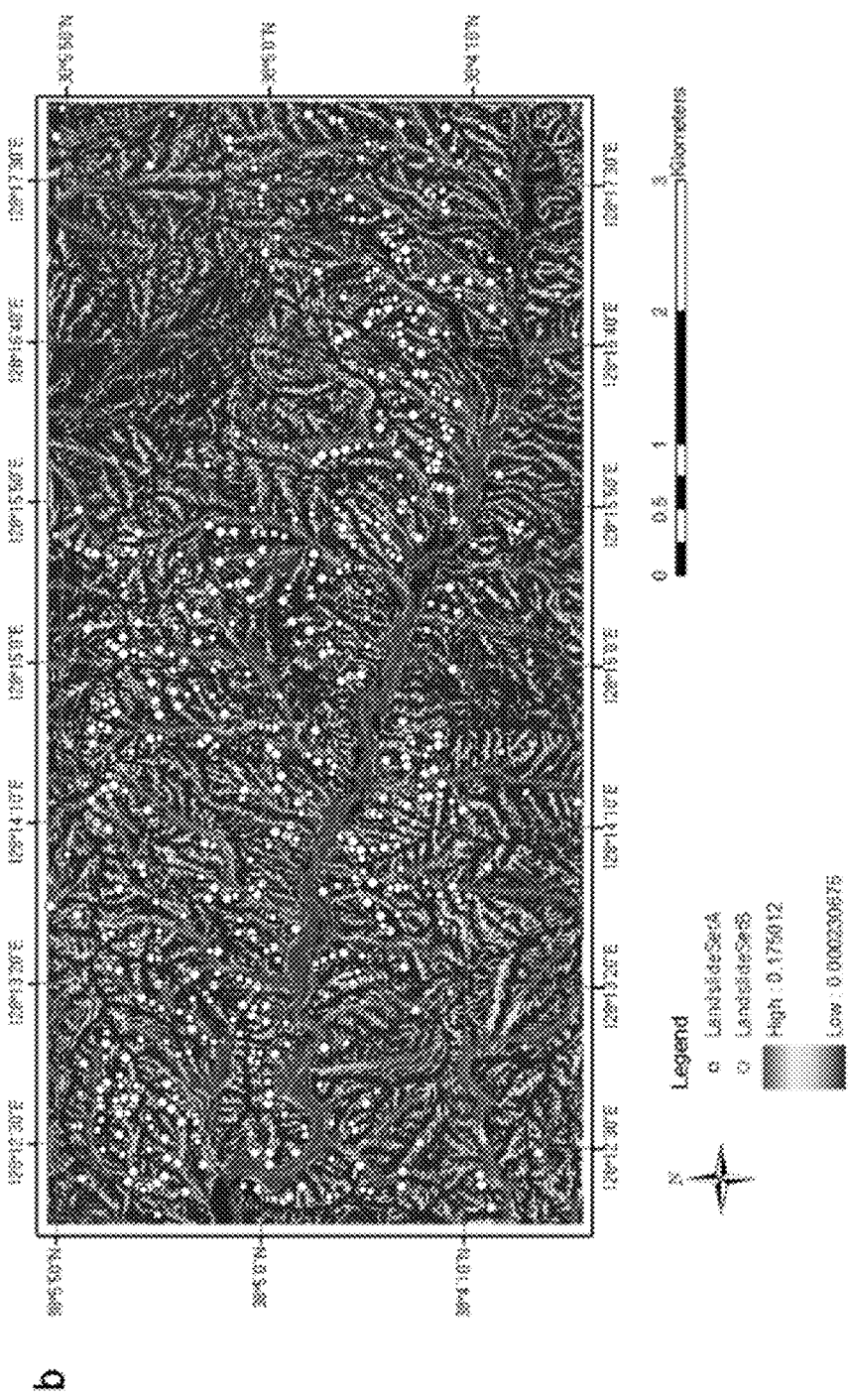
FIG. 5 is a view illustrating results of a cross-validation on two subgroups (LandslideSetA marked as a rectangle (□), LandslideSetB marked as a circle (○)) which spatial events data is divided into for performance evaluation according to an embodiment of the present invention.

FIG. 5 is a view illustrating results of a cross-validation on two subgroups (LandslideSetA marked as a rectangle (□), LandslideSetB marked as a circle (○)) which spatial events data is divided into for performance evaluation according to an embodiment of the present invention.

First, as shown in FIG. 1, a leaf node ranking method (S100) in decision trees for spatial prediction according to an embodiment of the present invention includes a spatial prediction data preparation step (S110); a decision tree construction step (S120); a leaf node ranking step (S130); and a prediction result obtaining step (S140).

The spatial prediction data preparation step (S110) may perform a geometric correction to a spatial event occurrence layer and a spatial event inducing environment layer in order that locations of the layers correspond to locations of each other with the same range, the layers being prediction targets and being data that the decision tree learns.

The decision tree construction step (S120) constructs a decision tree having one root node, in which each parent node has multiple child nodes, by using the spatial prediction data as training data, and each node may have a structure to store the number of event-occurring classes and of non-event-occurring classes in which the training data is classified for computing a rank of a leaf node.

The leaf node ranking step (S130) reflects a ranking result calculated from the root node on the child node using the decision tree constructed through the learning process, and may compute the rank of the leaf node using the number of event-occurring classes and of non-event-occurring classes, the number of the classes being included in each node on the paths from the root node to all leaf nodes.

The prediction result obtaining step (S140) maps the rank (priority) of the leaf node to a location on a spatial coordinate.

Here, the leaf node ranking step (S130) makes the child node inherit the rank form the parent node to prevent the ranking result from being biased to the extreme value, 0 or 1, whereby the rank is compensated with the rank of a child node split from the same parent node. A relation between the ranks of the parent node (R(node.parent)) and child node (R(node.child)) is represented as equation 4.

$$R(node.parent) \leq R(node.child) \quad \text{[equation 4]}$$

In this case, when the rank of the parent node (R(node.parent)) is the same as the rank of the child node (R(node.child)), the child node does not include a spatial event-occurring class. When the child node includes an event-occurring class, the rank of the child node is more than the rank of the parent node.

For example, referring to FIG. 2, if the decision tree shown in the left side of FIG. 2 is induced from the location in which a probable event occurs, shown in the right side of FIG. 2, a root node of the decision tree includes both the number of event-occurring classes, marked with a plus sign (+), and the number of non-event-occurring classes, marked with a minus sign (−). After that, the tree forms child nodes according to the splitting criteria. Accordingly, using the tree constructed to include these class distributions, the rank of the leaf node is computed, and the leaf node ranking step (S130) proposed by the present invention is performed using the equation 5 as follows.

$$R(node.child) = R(node.parent) + \frac{n_{event}}{(n_{event} + n_{non\_event}) \times d} \quad \text{[equation 5]}$$

Here, d indicates a depth of a node in the tree.

Using equation 5, ranking results of the leaf nodes of the decision tree in FIG. 2 are computed as R(leaf1)=0.008, R(leaf2)=0.017, R(leaf3)=0.024, and R(leaf4)=0.019. The computed rank of each leaf node is mapped to the rectangle whose number corresponds to the number of the leaf node in FIG. 2, whereby the result of the spatial event prediction comes from the relative rank value.

Hereinafter, the exemplary embodiment in which the leaf node ranking method in decision trees for spatial prediction is applied to the landslide spatial event will be described.

First, a landslide, which is a typical spatial event, is mostly caused by intensive rainfalls or earthquakes. However, the scale of the landslide or whether the landslide occurs may be different by environmental conditions such as topography, geological features (soil), forest floor, and the like. Consequently, the landslide spatial event, which is a future event, may be predicted using similar conditions in a location where landslides previously occurred.

Resources needed for the exemplary embodiment are as follows.

First, a target area is located in between Inje-eup and Buk-myeon of the Kangwondo province in Korea, and a location of landslides may be extracted by analyzing aerial photographs and a triangulated irregular network. Additionally, the triangulated irregular network is a sort of spatial data structure constructed by dividing a space into irregular triangles. The triangulated irregular network is used for analysis of surface and geography, for example, analysis of topographic gradient, strike of stratum, terrain volume, and surface length, sectional view generation, analysis of rivers, extraction of ridges, topographic visibility analysis, and the like.

A topographic map and a forest map may be map data used for extracting landslide-related factors. Topographical factors (for example, aspect, curvature, ridge, and slope) are factors related to occurrence of landslides.

Factors of the forest map (age, density, diameter, and type) reflect states of plants and trees, which may help landslide prevention. Soil factors (texture, drainage, material, and thickness) are factors effecting on the scale of a landslide.

TABLE 1

| Map Source | Thematic Layer | Scale |
| --- | --- | --- |
| Airborne Image | Landslide | 0.4 m |
| Topographic map | Aspect | 1:25,000 |
| | Curvature | |
| | Ridge | |
| | Slope | |
| Forest map | Age | 1:25,000 |
| | Density | |
| | Diameter | |
| | Type | |
| Soil map | Texture | 1:25,000 |
| | Drainage | |
| | Material | |
| | Thickness | |

Converted into 5×5 m float-type raster images of 1,387,870

Table 1 illustrates components of spatial events and environment data sets.

Referring to FIG. 5, locations of spatial events are included in two groups, LandslideSetA, which is marked as a rectangle (□), and LandslideSetB, which is marked as a circle (○). In this case, FIG. 5 (a) shows that a prediction model is made by LandslideSetA and is evaluated using LandslideSetB, while (b) shows that the prediction model is made by LandslideSetB and is evaluated using LandslideSetA, and then the average of the two results is calculated.

In other words, referring to FIG. 4, the result of cross-validation on two subgroups that landslide spatial event data is divided into, is 86.09%, which shows a high predictive evaluation result. In addition to high performance, the present invention does not require an extra process for finding optimal parameter values compared to other leaf node ranking methods. These results are attributed as the present invention does not use class distribution of simple leaf nodes, but reflects a rank of a parent node on a computing process of a rank of a child node to prevent biased ranking results.

The leaf node ranking method in decision trees for spatial prediction according to the present invention may be implemented in the form of program instructions that can be executed by various computer components and may be stored on a computer-readable recording medium. The computer-readable recording medium may include program instructions, data files, data structures and the like separately or in combination. The program instructions stored on the computer-readable recording medium may be specially designed and configured for the present invention, or may also be known and available to those skilled in the computer software field.

Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

When deducing a rank, which may be considered as a degree of confidence of an event class according to splitting criteria, from training data or when estimating a probability of the event class, if a data set has a great imbalance between estimated classes, the estimate probability to the event occurrence is usually very low. Therefore, it is necessary to consider a relative rank. Consequently, the leaf node ranking method in decision trees for spatial prediction according to an embodiment of the present invention reflects a rank of a parent node on a computing process of a rank of a child node, whereby it may reduce a sharp difference between ranks of child nodes split from the same parent node. Accordingly, performance of predictability may be improved.

As conventional methods estimate ranks from dispersion using uniform class distribution of leaf nodes, those are not ideal for data sets having a great imbalance. Accordingly, an additional process is necessary to obtain optimal parameter values.

Also, the conventional leaf node ranking methods is considered to be used for only non-spatial applications.

However, the leaf node ranking method in decision trees for spatial prediction, proposed by the present invention, has advantages of not requiring an additional process for finding values for parameters.

Although the preferred embodiments of the present invention have been disclosed for illustrative purposes, those skilled in the art will appreciate that various modifications, additions and substitutions are possible without departing from the scope and spirit of the invention as disclosed in the accompanying claims. Accordingly, the disclosed embodiments should not be construed to limit the technical spirit of the present invention, but should be construed to illustrate the technical spirit of the present invention. The scope of the technical spirit of the present invention is not limited by the embodiments. The scope of the present invention should be interpreted according to the following appended claims. Accordingly, the present invention should be construed to cover all modifications or variations induced from the meaning and scope of the appended claims and their equivalents.

What is claimed is:

1. A leaf node ranking method in decision trees, performed by a computer, for spatial prediction, comprising:
   a memory; and
   program instructions in the memory for:
      a spatial prediction data preparation operation that performs a geometric correction to a spatial event occur rence layer and a spatial event inducing environment layer such that locations of the spatial event occurrence layer and the spatial event inducing environment layer correspond to locations of the other layer within the same range, the spatial event occurrence layer and the spatial event inducing environment layer being prediction targets and data that a decision tree learns;

a decision tree construction operation that constructs the decision tree using the spatial prediction data as training data, the decision tree including a root node, a parent node, and a plurality of child nodes associated with the parent node, a leaf node ranking operation that (i) performs a ranking result using the decision tree, the ranking result calculated from the root node on the child node, and (ii) calculates a rank using a number of event-occurring classes and a number of non-event-occurring classes included in each node on paths from the root node to all leaf nodes; and a prediction result obtaining operation that maps the rank of the leaf node to a location on a spatial coordinate, each node storing the event-occurring classes and non-event-occurring classes in which training data is classified, for computing the rank of the leaf node, wherein
the leaf node ranking operation is performed using the equation:

$$R(node.child) = R(node.parent) + \frac{n_{event}}{(n_{event} + n_{non\_event}) \times d},$$

where (a) R(node.child) represents the rank of the child node, (b) R(node.parent) represents the rank of the parent node, (c) $n_{event}$ represents the number of event-occurring classes, (d) $n_{non\_event}$ represents the number of non-event occurring classes, and (e) d represents a depth of a node in a tree.

2. The method of claim 1, wherein:

$R(node.parent) \leq R(node.child)$, when a rank of the parent node (R(node.parent)) is the same as a rank of the child node (R(node.child)), the child node does not include a spatial event-occurring class, and when the rank of the child node is more than the rank of the parent node, the child node includes an event-occurring class.

* * * * *